United States Patent [19]

Chaser

[11] 4,444,929
[45] Apr. 24, 1984

[54] UNSYMMETRICAL PHOSPHITE-PHENOLIC ISOCYANURATE STABILIZER COMBINATIONS

[75] Inventor: Dwight W. Chaser, Northfield, Ohio

[73] Assignee: The B. F. Goodrich Company, Akron, Ohio

[21] Appl. No.: 444,281

[22] Filed: Nov. 24, 1982

[51] Int. Cl.$^3$ .............................. C08K 5/34; C08K 5/52
[52] U.S. Cl. ............................... 524/101; 252/400 R; 260/967; 524/151
[58] Field of Search ................ 260/967; 524/101, 151; 252/400.24

[56] References Cited

U.S. PATENT DOCUMENTS

| | | | |
|---|---|---|---|
| 2,058,343 | 10/1936 | Moran et al. | 252/49.8 |
| 2,220,845 | 11/1940 | Moyle | 260/967 |
| 3,231,531 | 1/1966 | Buckley et al. | 524/151 |
| 3,271,481 | 9/1966 | Kujawa et al. | 260/967 |
| 3,305,520 | 2/1967 | Fritz et al. | 260/967 |
| 3,344,205 | 9/1967 | Grey et al. | 524/151 |
| 3,415,907 | 12/1968 | Sconce et al. | 260/967 |
| 3,558,554 | 1/1971 | Kuriyama et al. | 524/147 |
| 4,187,212 | 2/1980 | Zinke et al. | 524/101 |
| 4,195,016 | 3/1980 | Spivack | 524/101 |
| 4,282,141 | 8/1981 | Minagawa et al. | 524/151 |

*Primary Examiner*—John Kight, III
*Assistant Examiner*—R. A. White
*Attorney, Agent, or Firm*—J. Hughes Powell, Jr.

[57] ABSTRACT

Sterically hindered 4-substituted-2,6-di-t-butylphenyl bis (substituted phenyl)phosphites form effective and improved antioxidant combinations with hydroxyphenylalkyleneyl isocyanurates. These systems provide enhanced antioxidant activity in organic materials subject to degradation by heat and oxygen, and are especeially effective in polymers such as the poly(olefins) represented by poly(propylene). The triphenyl phosphites are readily prepared by reacting a 2,6-di-t-butyl-4-substituted-phenylphosphorodichloridite with a sodium salt of a 2-t-butyl-substituted phenol.

18 Claims, No Drawings

UNSYMMETRICAL PHOSPHITE-PHENOLIC ISOCYANURATE STABILIZER COMBINATIONS

BACKGROUND OF THE INVENTION

Hydroxyphenylalkyleneyl isocyanurates such as (3,5-di-t-butyl-4-hydroxybenzyl)isocyanurate are useful antioxidants for organic materials subject to attack and degradation by heat and oxygen. They find particular utility in polyolefins. It is desirable to improve the antioxidant and other properties of these materials, particularly at high temperatures. It has been observed that certain phosphorus containing compounds, U.S. Pat. No. 3,351,483, are useful in enhancing the ultraviolet resistant properties of the hydroxyphenylalkyleneyl isocyanurates. Although many phosphorus compounds are available, only a few have been found to have value as enhancers for the stabilizing activity of hydroxyphenylalkyleneyl isocyanurates, and the best of these are deficient in several properties, particularly hydrolytic instability, both in storage and in use. Improved combinations of hydroxyphenylalkyleneyl isocyanurates and phosphorus containing compounds are desired that result in synergistic combinations as to antioxidant properties, especially as shown by oven aging, that are not subject to hydrolysis, and that provide excellent color and processing properties to materials containing the combination of hydroxyphenylalkyleneyl isocyanurate and phosphorus compound.

SUMMARY OF THE INVENTION

Effective stabilizer systems are obtained through the use of sterically hindered 4-substituted-2,6-di-t-butylphenyl bis (substituted phenyl)phosphites in combination with hydroxyphenylalkyleneyl isocyanurates. These systems provide enhanced antioxidant activity in organic materials that are subject to degradation by heat and oxygen, especially in polymers, including polyolefins.

DETAILED DESCRIPTION

The sterically hindered triphenyl phosphites used in combination with the hydroxyphenylalkyleneyl isocyanurates are 4-substituted-2,6-di-t-butylphenyl bis(substituted phenyl)phosphites. These highly hindered mixed phenolic phosphites are prepared from a totally hindered phenol such as 4-substituted-2,6-di-t-butylphenols, and lesser hindered phenols such as 2-t-butyl-alkyl substituted phenols. The reaction scheme used to prepare the defined 4-substituted-2,6-di-t-butylphenyl bis(substitiuted phenyl)phosphites was by the reaction of a phosphorodichloridite of the totally hindered phenol with a sodium salt of the less hindered phenol. The resulting reaction products have the general formula:

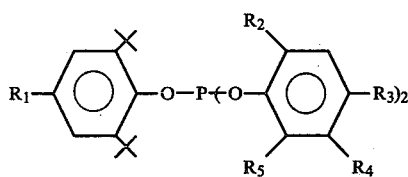

wherein:
⊹ is t-butyl or t-pentyl;
$R_1$ is hydrogen, an alkyl radical containing 1 to 9 carbon atoms, a cycloalkyl radical containing 3 to 6 carbon atoms, halogen, an alkoxy radical containing 1 to 8 carbon atoms, phenyl, a t-alkyl radical containing 4 to 8 carbon atoms, and a

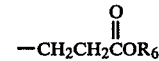

group, wherein $R_6$ is an alkyl radical containing 1 to 8 carbon atoms;
$R_2$ is a primary, secondary or tertiary alkyl radical containing 1 to 8 carbon atoms;
$R_3$ is hydrogen, or a primary, secondary or tertiary alkyl radical containing 1 to 8 carbon atoms;
$R_4$ is hydrogen or a primary alkyl radical containing 1 to 4 carbon atoms; and
$R_5$ is hydrogen or a primary or secondary alkyl radical containing 1 to 4 carbon atoms.

A preferred group of compounds is obtained when:
⊹ is t-butyl;
$R_1$ is hydrogen, a primary, secondary or tertiary alkyl radical of 1 to 4 carbon atoms and in the

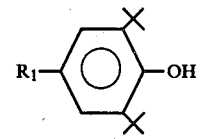

group $R_6$ is methyl or ethyl;
$R_2$ is methyl or t-butyl;
$R_3$ is hydrogen, methyl or t-butyl;
$R_4$ is hydrogen or methyl; and
$R_5$ is hydrogen or methyl.

The completely hindered phenols for preparing the triphenyl phosphites have the general formula

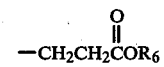

wherein:
⊹is t-butyl or t-pentyl;
$R_1$ is hydrogen, an alkyl radical containing 1 to 9 carbon atoms, a cycloalkyl radical containing 3 to 6 carbon atoms, halogen, an alkoxy radical containing 1 to 8 carbon atoms, phenyl, t-alkyl radical containing 4 to 8 carbon atoms, and a

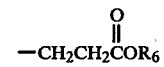

group where $R_6$ is an alkyl radical containing 1 to 8 carbon atoms.

A preferred group of phenols are those wherein is t-butyl, and $R_1$ is hydrogen, a primary, secondary or tertiary alkyl group of 1 to 4 carbon atoms and the

—CH$_2$CH$_2$COR$_6$ group where $R_6$ is methyl or ethyl.

Examples of totally hindered phenols include 2,6-di-t-butyl-4-methylphenol, 2,6-di-t-butyl-4-ethylphenol, 2,6-di-t-butyl-4-n-propylphenol, 2,6-di-t-butyl-4-isopropylphenol, 2,6-di-t-butyl-4-n-butylphenol, 2,4,6-tri-t-butylphenol, 2,6-di-t-pentyl-4-methylphenol, 3,5-di-t-butyl-4-hydroxybenzyl ether, 2,6-di-t-butyl-4-(2-carbethoxyethyl)phenol, and the like.

The less hindered phenols have the general formula:

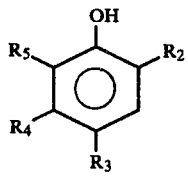

wherein:
$R_2$ is an primary, secondary or tertiary alkyl radical containing 1 to 8 carbon atoms;
$R_3$ is hydrogen, or a primary, secondary or tertiary alkyl radical containing 1 to 8 carbon atoms;
$R_4$ is hydrogen or a primary alkyl radical containing 1 to 4 carbon atoms; and
$R_5$ is hydrogen or a primary or secondary alkyl radical containing 1 to 4 carbon atoms.

A preferred group of phenols are those wherein:
$R_2$ is methyl or t-butyl;
$R_3$ is hydrogen, methyl or t-butyl;
$R_4$ is hydrogen or methyl; and
$R_5$ is hydrogen or methyl.

Examples of lesser hindered phenols include 2-t-butylphenol, 2,4-di-t-butylphenol, 2-t-butyl-4,6-dimethylphenol, 2,4-dimethylphenol, 2-t-butyl-5-methylphenol, 2-t-butyl-4-methylphenol, and the like.

The hydroxyphenylalkyleneyl isocyanurate compounds used in combination with the hindered phenolic phosphites of this invention have the formula

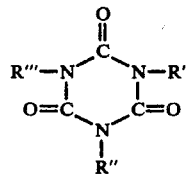

wherein R' is a hydroxyphenylalkyleneyl radical of the formula

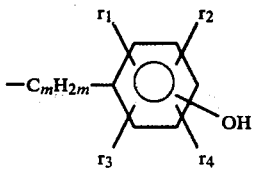

where m is 1 to 4, $r_1$ is an alkyl radical having 1 to 18 carbon atoms and is positioned immediately adjacent to the hydroxy group on the ring; $r_2$, $r_3$, and $r_4$ are hydrogen or an alkyl radical containing 1 to 18 carbon atoms; and R" and R''' are hydrogen, an alkyl radical containing 1 to 18 carbon atoms, or are the same as R'. A more preferred compound is when R" and R''' are equal to R', i.e., all the R groups are hydroxyphenylalkyleneyl radicals, and $r_1$ is a t-alkyl radical containing from 4 to about 12 carbon atoms, $r_2$ is a t-alkyl radical containing from 1 to about 12 carbon atoms, $r_3$ and $r_4$ are hydrogen, and m=1.

Even more preferred are the symmetrical tris (3,5-di-tert-alkyl-4-hydroxybenzyl) isocyanurates of the formula

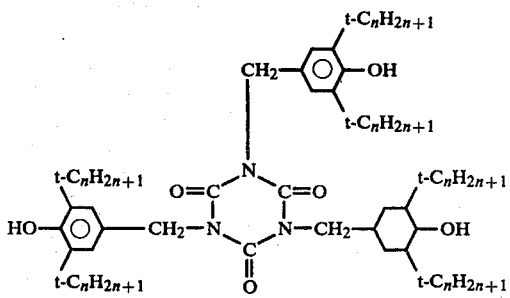

where n is 4 to 8.

Examples of the 4-hydroxybenzyl isocyanurate compounds are: tris-(3-t-butyl-4-hydroxybenzyl) isocyanurate, tris-(3-cetyl-4-hydroxybenzyl) isocyanurate, tris(3,5-dimethyl-4-hydroxybenzyl) isocyanurate, tris-(3-methyl-5-isopropyl-4-hydroxybenzyl) isocyanurate, tris(3,5-di-t-butyl-4-hydroxybenzyl) isocyanurate, tris-(3-t-butyl-5-t-amyl-4-hydroxybenzyl) isocyanurate, tris-[3,5-di-(1-methyl-1-ethylpropyl)4-hydroxybenzyl] isocyanurate, tris-[3,5,-di-(1,1,2,2-tetramethylpropyl)-4-hydroxybenzyl] isocyanurate, bis-(3,5-dimethyl-4-hydroxybenzyl) isocyanurate, (3-methyl-4-hydroxybenzyl) isocyanurate, (3-t-butyl-4-hydroxybenzyl) isocyanurate, and the like. Reference is made to U.S. Pat. No. 3,531,483 which discloses isocyanurate compounds encompassed by this invention. The disclosure of this patent is incorporated herein by reference.

The amount of hindered phenolic phosphites used as stabilizers may vary from about 0.01 to 10 weight parts per 100 weight parts of material to be stabilized. More usually about 0.1 to 4.0 parts are used for mixtures with the hydroxyphenylalkyleneyl isocyanurate. The hydroxyphenylalkyleneyl isocyanurate compound is used at a level from about 0.01 part to about 5 parts by weight, and more preferably at from about 0.05 part to about 3 parts by weight per 100 parts by weight of the organic material. The triphenyl phosphite compound is employed at similar levels, i.e., from about 0.01 part to 5 parts and preferably at about 0.05 part to about 3 parts by weight per 100 parts by weight of organic material. Thus the combined weight of the compounds is normally from about 0.02 part to about 10 parts and more preferably from about 0.1 to 6 parts by weight per 100 parts by weight of organic material. The hydroxyphenylalkyleneyl isocyanurate can be used in from about 10:1 to 1:10 weight ratio of isocyanurate compound to triaryl phosphite compound. Excellent results are obtained at about a 3:1 to 1:3 weight ratio. A 1:1 weight ratio of the compounds provides effective stabilization of organic materials.

The sterically hindered triphenyl phosphites described hereinafter were prepared as follows. The hindered phenols were converted to the sodium salt, sodium phenolate, by reacting sodium hydride with the alkylphenol. For example, 0.75 gram (0.031 mol) of sodium hydride as a 50% dispersion in mineral oil, was added to 5.12 grams (0.031 mol) of 2-t-butyl-5-methylphenol dissolved in 75 ml of dry tetrahydrofuran. The mixture was heated at 50° C. for one hour to form the sodium salt.

The phosphorodichloridite of the completely hindered phenol was prepared by reacting the phenol, for example, 78.9 grams (0.36 mol) of 2,6-di-t-butyl-4-methylphenol with 150 grams (1.09 mol) phosphorus trichloride in the presence of 41.6 grams of triethylene amine catalyst at about 80° C. for 3.5 hours to form the 2,6-di-t-butyl-4-methylphenylphosphorodichloridite that was isolated by distillation.

5.0 grams (0.015 mol) of the 2,6-di-t-butyl-4-methylphenylphosphorodichloridite in 10 ml of dry tetrahydrofuran was added at room temperature under a nitrogen atmosphere to a solution of 5.58 grams of the sodium-2-t-butyl-5-methylphenolate (0.03 mol) dissolved in 75 ml of dry tetrahydrofuran. The reaction mixture was stirred at room temperature for 2 hours, filtered, and the filtrate evaporated to dryness. If the recovered reaction product was a solid, it was washed with a solvent; if it was oil, the low boils were removed by distillation. Purity was determined by Gas Chromatography.

The following named hindered triphenyl phosphites were prepared from the named reactants. For each compound, it was identified and the named structure was confirmed by nuclear magnetic resonance, mass spectrometry, and and infra red spectra. To demonstrate the enhanced and unexpected improvement in antioxidant activity obtained when these hindered triphenyl phosphites are combined with a hydroxyphenylalkyleneyl isocyanurate, a series of tests in polypropylene were run as described in the next paragraphs.

Test samples of the triphenyl phosphites and hydroxyphenylalkyleneyl isocyanurates in polypropylene were prepared by mixing the stabilizer compounds with polypropylene in a Brabender Plasticorder fitted with a Cam-Head (mixing chamber). The polypropylene is first masticated for 1½ minutes at 190° C. Then the stabilizer mixture is added, followed by 3 minutes additional mixing. The mass is removed and pressed into 20 mil thick sheets. From these sheets are cut 1"×1" plaques for oven aging.

The unexpected synergistic enhancement of anti-oxidant activity when the triphenylphosphites of this invention are combined with a hydroxyphenylalkyleneyl isocyanurate is demonstrated with test samples of polypropylene containing 0.05 weight part each of tris(3,5-di-t-butyl-4-hydroxybenzyl)isocyanurate and the triphenyl phosphites tested in the air oven. Thermal/oxidative stability (oven aging) testing consisted of aging the samples in triplicate in an air-circulating oven at 125° C. The time to catastrophic crumbling (failure) of the plaque is measured and reported as days to failure. The results obtained are set forth at the end of each of the following paragraphs.

2,6-di-t-butyl-4-methylphenyl bis(2-t-butylphenyl)phosphite, m.p. 90°-103° C.—prepared from 2,6-di-t-butyl-4-methylphenol and 2-t-butylphenol.

Air Oven—49⅓ days.

2,6-di-t-butyl-4-methylphenyl bis(2,4-di-t-butylphenyl)phosphite, m.p. 141°-146° C.—prepared from 2,6-di-t-butyl-4-methylphenol and 2,4-di-t-butylphenol.

Air Oven—81⅓ days.

2,6-di-t-butyl-4-methylphenyl bis(2-t-butyl-4,6-dimethylphenyl)phosphite, a glass—prepared from 2,6-di-t-butyl-4-methyl-phenol and 2-t-butyl-4,6-dimethylphenol.

Air Oven—101⅔ days.

2,6-di-t-butyl-4-methylphenyl bis(2,4-dimethylphenyl)phosphite, an oil—prepared from 2,6-di-t-butyl-4-methylphenol and 2,4-dimethylphenol.

Air Oven—75 days.

2,6-di-t-butyl-4-methylphenyl bis(2-t-butyl-5-methylphenyl)phosphite, an oil—prepared from 2,6-di-t-butyl-4-methylphenol and 2-t-butyl-5-methylphenol.

Air Oven—101⅔ days.

2,6-di-t-butyl-4-methylphenyl bis(2-t-butyl-4-methylphenyl)phosphite, m.p. 98°-104° C.—prepared from 2,6-di-t-butyl-4-methylphenol and 2-t-butyl-4-methylphenol.

Air Oven—68⅔ days.

2,4,6-tri-t-butylphenyl bis(2-t-butyl-5-methylphenyl)phosphite, a glass—prepared from 2,4,6-tri-t-butylphenol and 2-t-butyl-5-methylphenol.

Air Oven—49⅔ days.

2,6-di-t-butyl-4-n-butyl bis(2-t-butylphenyl)phosphite, an oil—prepared from 2,6-di-t-butyl-4-n-butylphenol and 2-t-butylphenol.

Air Oven—61¼ days.

2,6-di-t-butyl-4-n-butyl bis(2,4-di-t-butylphenyl)phosphite, an oil—prepared from 2,6-di-t-butyl-4-n-butylphenol and 2,4-di-t-butylphenol.

Air Oven—65¼ days.

2,6-di-t-butyl-4-n-butyl bis(2-t-butyl-5-methylphenyl)phosphite, a glass—prepared from 2,6-di-t-butyl-4-n-butylphenol and 2-t-butyl-5-methylphenol.

Air Oven—90¼ days.

2,6-di-t-butyl-4-n-butyl bis(2-t-butyl-4-methylphenyl)phosphite, a glass—prepared from 2,6-di-t-butyl-4-n-butylphenol and 2-t-butyl-4-methylphenol.

Air Oven—54⅓ days.

2,6-di-t-butyl-4-(2-carbethoxyethyl) bis(2-t-butyl-5-methylphenyl)phosphite, a glass—prepared from 2,6-di-t-butyl-4-(2-carbethoxyethyl)phenol and 2-t-butyl-5-methylphenol.

Air Oven—51 days.

2,6-di-t-butyl-4-(2-carbethoxyethyl) bis(2-t-butyl-4-methylphenyl)phosphite, an oil—prepared from 2,6-di-t-butyl-4-(2-carbethoxyethyl)phenol and 2-t-butyl-4-methylphenol.

Air Oven—46⅔ days.

Bis(2-t-butyl-4-methylphenyl) 3,5-di-t-butyl-4-hydroxybenzyl ether diphosphite, an off-white solid—prepared from 3,5-di-t-butyl-4-hydroxybenzyl ether and 2-t-butyl-4-methylphenol.

Air Oven—51⅓ days.

When polypropylene samples were prepared with 0.1 weight part of the above described hindered triphenyl phosphites only, the days to catastrophic failure varied from 5 to 9⅔ days. Polypropylene samples containg 0.1 weight part of tris(3,5-di-t-butyl-4-hydroxybenzyl)isocyanurate failed after 43 days. These values are to be contrasted to the values reported above where with only 0.05 weight part of tris(3,5-di-t-butyl-4-hydroxybenzyl)isocyanurate and 0.05 weight parts of the various hindered triphenyl phosphites, values as high as 100+ days were unexpectedly obtained, which results represent an unobivous and unexpected synergism.

These oven aging values are better than those obtained with some commercially available phosphite stabilizers in the same compositions. For example, when these oven aging tests are repeated with 0.05 weight part of tris(2,4-di-t-butylphenyl)phosphite and 0.05 weight part of the hydroxyphenylalkyleneyl isocyanurate, a value of only 35⅔ days was obtained.

The combinations of the hydroxyphenylalkyleneyl isocyanurate compounds and the triphenyl phosphite compounds as defined herein provide exceptional heat stability to polyolefin polymers. The combination is especially useful for the stabilization of α-monoolefin homopolymers and copolymers, wherein the α-monoolefin contains 2 to about 8 carbon atoms. High and low-density polyethylene, isotactic and atactic polypropylene, polyisobutylene, and poly(4-methyl-1-pentene) have excellent resistance to ultra violet light when stabilized with the combinations of the present invention. Ethylene-propylene (EP) copolymers and ethylene-propylene (EPDM) terpolymers generally containing less than about 10 percent by weight of one or more monomers containing multiple unsaturation provided, for example, by 1,4-hexadiene, dimethyl-1,4,9-decatriene, dicyclopentadiene, vinyl norbornene, ethylidene norbornene and the like also are stabilized using the combination.

Other organic materials which can be stabilized in accordance with the present invention include both natural and synthetic polymers. For example, the stabilizers are useful for the stabilization of cellulosic materials; natural rubber, halogenated rubber, conjugated diene polymers, as, for instance, polybutadiene, copolymers of butadiene with styrene, acrylonitrile, acrylic acid, alkyl acrylates or methacrylates, methyl vinyl ketone, vinyl pyridine, etc.; polyisoprene, polychloroprene, and the like; vinyl polymers such as polyvinyl chloride, polyvinylidene chloride, copolymers of vinyl chloride with vinylidene chloride, polyvinyl acetate, copolymers or vinyl halide with butadiene, styrene, vinyl esters, α,β-unsaturated ketones and aldehydes, and the like; homopolymers and copolymers of acrylic monomers such as methyl acrylate, methyl methacrylate, ethyl acrylate, 3-ethylhexyl acrylate, acrylamide, methacrylamide, N-methylol-acrylamide, acrylonitrile, methacrylonitrile, and the like; epihalohydrin polymers; polyether- or polyol-derived polyurethanes; acetal homo-polymers and copolymers; polycarbonates; polyesters such as those derived from maleic, fumaric, itaconic, or terephthalic anhydrides, or the like; for example, polyethylene terephthalate; polyamides such as those derived from the reaction of hexa-methylenediamine with adipic or sebacic acid; epoxy resins such as those obtained from the condensation of epichlorohydrin with bisphenols; ring opened olefin polymers and the like. Polymer blends, that is, physical admixture of two or more polymers may also be stabilized in accordance with the present invention.

In addition to polymeric materials, the present compounds may stabilize a wide variety of other organic materials. Such compounds include: waxes, synthetic and petroleum-derived lubricating oils and greases; animal oils such as, for example, fat, tallow, lard, cod-liver oil, sperm oil; vegetable oils such as castor, linseed, peanut, palm, cotton seed, and the like; fuel oil; diesel oil, gasoline, and the like.

The compounds are readily incorporated into materials by dissolving or dispersing them with the materials or in liquid, dispersion solutions and solid forms. If the material is a solid, especially a polymeric solid such as a rubber or a plastic, the compounds can be admixed using internal mixers as Banburys, extruders, two-roll mills, and the like, following conventional techniques. One way to disperse the compounds in plastic materials is to dissolve or suspend the compounds in a solvent, mix the mixture with a plastic in powder or solution form, and then evaporate the solvent.

Compositions containing the novel combination of compounds can also contain other known compounding ingredients such as fillers like carbon black, silica, metal carbonates, talc, asbestos, and the like; pigments and colorants; curative ingredients like sulfur and peroxides and vulcanization accelerators; fungicides; processing aids, reinforcing agents and standard ingredients known to the art. Other ingredients known in the art as ultraviolet light, thermal and/or oxidative stabilizers can also be used in the stabilized compositions.

I claim:

1. Stabilizer compositions for organic materials comprising (1) 4-substituted-2,6-di-t-butylphenyl bis(substituted phenyl)phosphites having the general formula

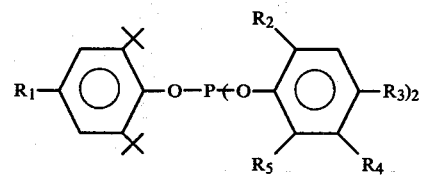

wherein: $+$ is t-butyl; $R^1$ is a primary or secondary alkyl radical containing 1 to 4 carbon atoms, a t-alkyl radical containing 4 to 8 carbon atoms, or a

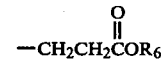

group, wherein $R_6$ is methyl or ethyl, $R_2$ is methyl or t-butyl; $R_3$ is hydrogen, methyl or t-butyl; $R_4$ is hydrogen or methyl; and $R_5$ is hydrogen or methyl; and (2) hydroxyphenylalkyleneyl isocyanurates of the formula

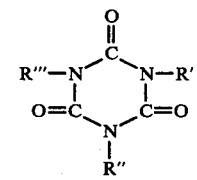

wherein R' is a hydroxyphenylalkyleneyl radical of the formula

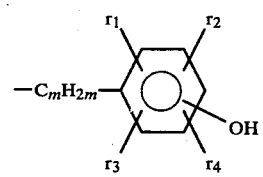

where m is 1 to 4, $r_1$ is an alkyl radical having 1 to 18 carbon atoms and is positioned immediately adjacent to the hydroxy group on the ring; $r_2$, $r_3$, and $r_4$ are hydrogen or an alkyl radical containing 1 to 18 carbon atoms; and R'' and R''' are hydrogen, an alkyl radical containing 1 to 18 carbon atoms, or are the same as R'.

2. A stabilizer composition of claim 1 wherein in (2) R'' and R''' are equal to R', $r_1$ is a tertiary alkyl radical containing 4 to 12 carbon atoms, $r_2$ is an alkyl radical containing 1 to 12 carbon atoms, $r_3$ and $r_4$ are hydrogen, and m is 1.

3. A stabilizer composition of claim 2 wherein (2) has the formula

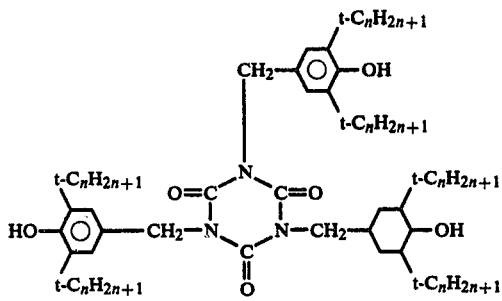

where n is 4 to 8.

4. A stabilizer composition of claim 3 where (2) is 1,3,5-tris(3,5-di-t-butyl-4-hydroxybenzyl)isocyanurate.

5. A stabilizer composition of claim 4 wherein (1) is 2,6-di-t-butyl-4-methylphenyl bis(2-t-butyl-4,6-dimethylphenyl)phosphite.

6. A stabilizer composition of claim 4 wherein (1) is 2,6-di-t-butyl-4-methylphenyl bis(2-t-butyl-5-methylphenyl)phosphite.

7. A stabilizer composition of claim 4 wherein (1) is 2,6-di-t-butyl-4-n-butyl bis(2-t-butyl-5-methylphenyl)phosphite.

8. A stabilizer composition of claim 4 wherein (1) is 2,6-di-t-butyl-4-methylphenyl bis(2,4-di-t-butylphenyl)phosphite.

9. A stabilizer composition of claim 4 wherein (1) is 2,6-di-t-butyl-4-methylphenyl bis(2,4-dimethylphenyl)phosphite.

10. A composition comprising organic materials subject to degradation and stabilizing amounts of (1) 4-substituted-2,6-di-t-butylphenyl bis(substituted phenyl)phosphites having the general formula

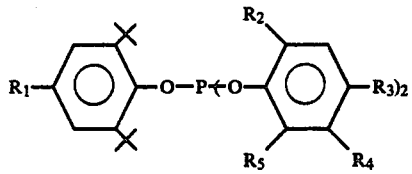

wherein: $+$ is t-butyl; $R_1$ is a primary or secondary alkyl radical containing 1 to 4 carbon atoms, a t-alkyl radical containing 4 to 8 carbon atoms, or a

group, wherein $R_6$ is a methyl or ethyl radical; $R_2$ is methyl or t-butyl; $R_3$ is hydrogen, methyl or t-butyl; $R_4$ is hydrogen or methyl; and $R_5$ is hydrogen or methyl; and (2) hydroxyphenylalkyleneyl isocyanurates of the formula

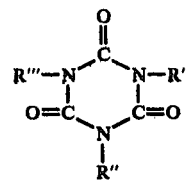

wherein R' is a hydroxyphenylalkyleneyl radical of the formula

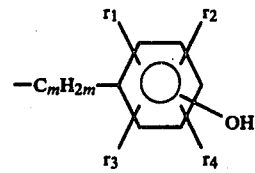

where m is 1 to 4, $r_1$ is an alkyl radical having 1 to 18 carbon atoms and is positioned immediately adjacent to the hydroxy group on the ring; $r_2$, $r_3$, and $r_4$ are hydrogen or an alkyl radical containing 1 to 18 carbon atoms; and R'' and R''' are hydrogen, an alkyl radical containing 1 to 18 carbon atoms, or are the same as R'.

11. A composition of claim 10 wherein the organic material is a polymer, and in (2) R'' and R''' are equal to R', $r_1$ is a tertiary alkyl radical containing 4 to 12 carbon atoms, $r_2$ is an alkyl radical containing 1 to 12 carbon atoms, $r_3$ and $r_4$ are hydrogen, and m is 1.

12. A composition of claim 11 wherein (2) has the formula

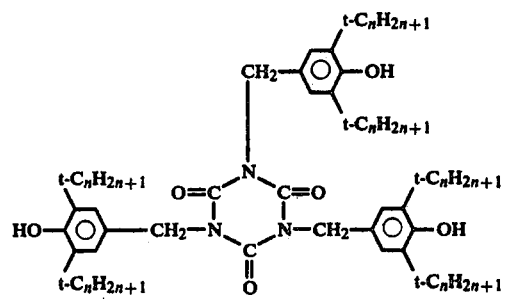

where n is 4 to 8.

13. A composition of claim 12 where (2) is 1,3,5-tris(3,5-di-t-butyl-4-hydroxybenzyl)isocyanurate.

14. A composition of claim 13 wherein said polymer is a polyolefin and (1) is 2,6-di-t-butyl-4-methylphenyl bis(2-t-butyl-4,6-dimethylphenyl)phosphite.

15. A composition of claim 13 wherein said polymer is a polyolefin and (1) is 2,6-di-t-butyl-4-methylphenyl bis(2-t-butyl-5-methylphenyl)phosphite.

16. A composition of claim 13 wherein said polymer is a polyolefin and (1) is 2,6-di-t-butyl-4-n-butyl bis(2-t-butyl-5-methylphenyl)phosphite.

17. A composition of claim 13 wherein said polymer is a polyolefin and (1) is 2,6-di-t-butyl-4-methylphenyl bis(2,4-di-t-butylphenyl)phosphite.

18. A composition of claim 13 wherein said polymer is a polyolefin and (1) is 2,6-di-t-butyl-4-methylphenyl bis(2,4-dimethylphenyl)phosphite.

* * * * *